June 16, 1925.
E. S. BRISTOL
1,542,030
CONTROL METHOD AND APPARATUS
Filed April 25, 1921  3 Sheets-Sheet 3
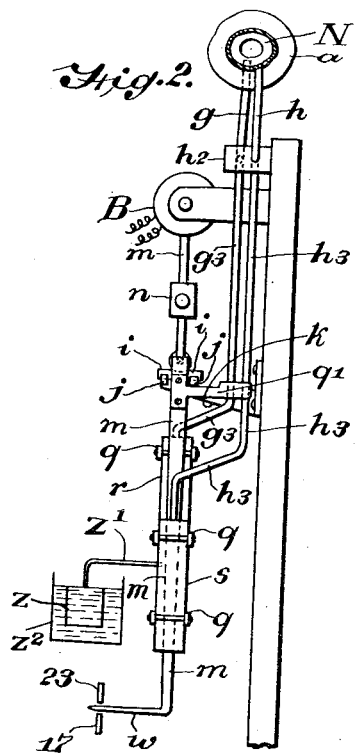
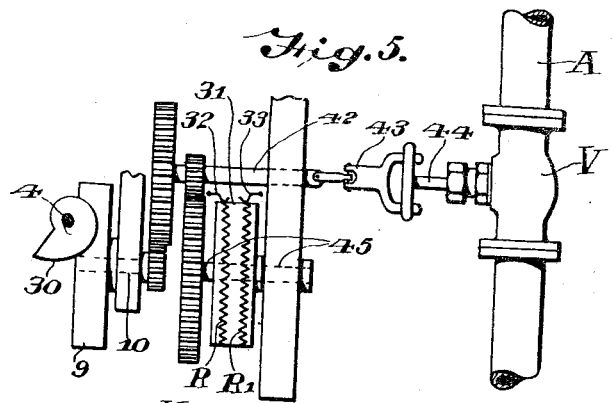
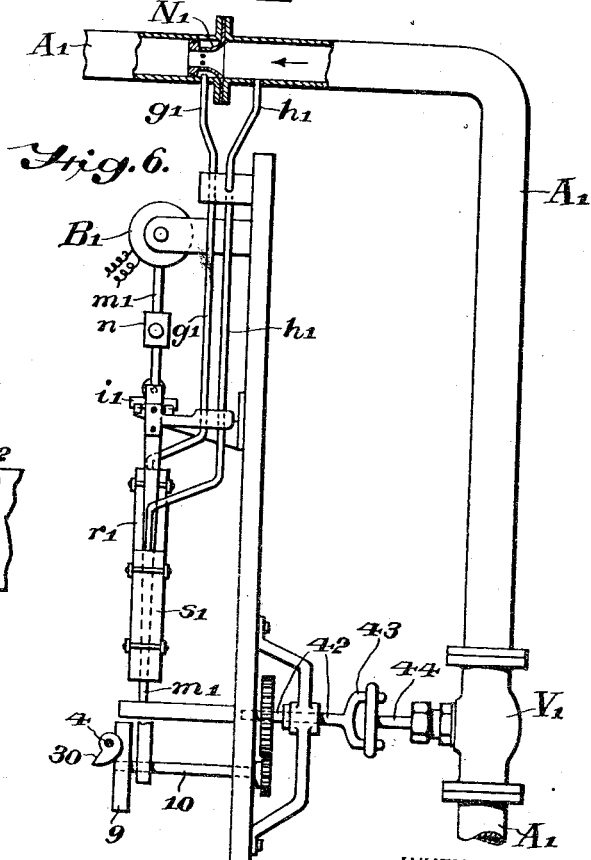
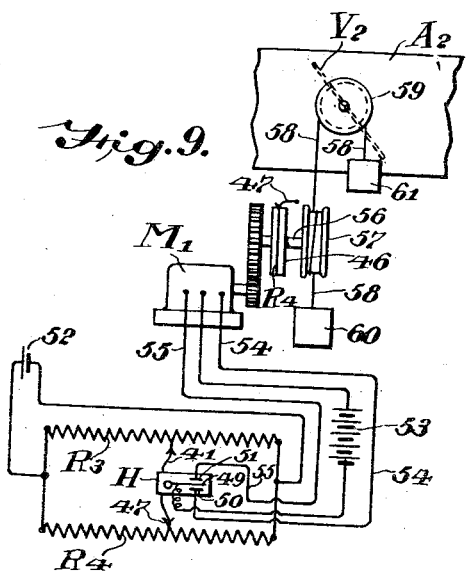
INVENTOR.
Edward S. Bristol
BY Cornelius D. Ehret
his ATTORNEY.

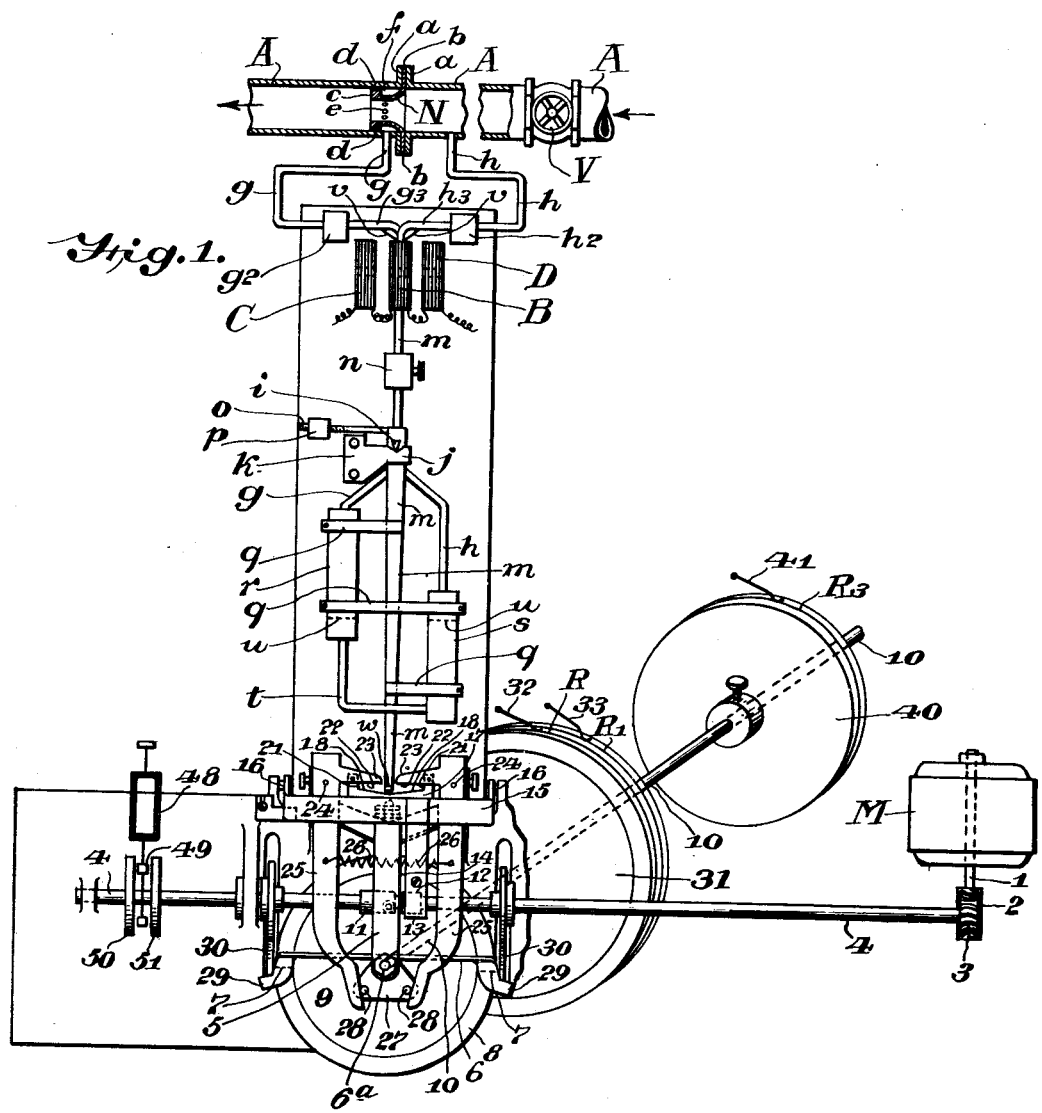

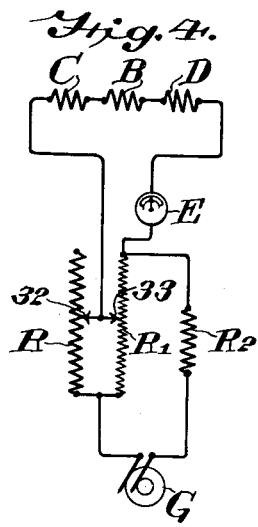
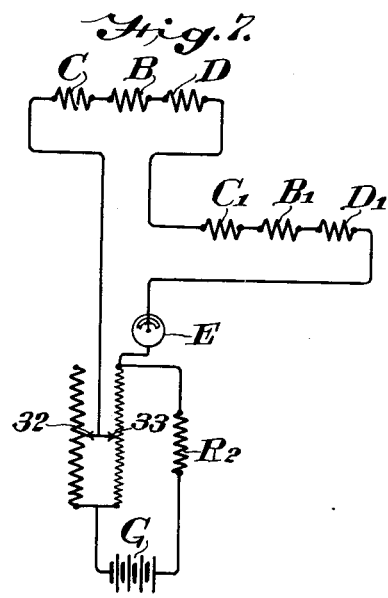
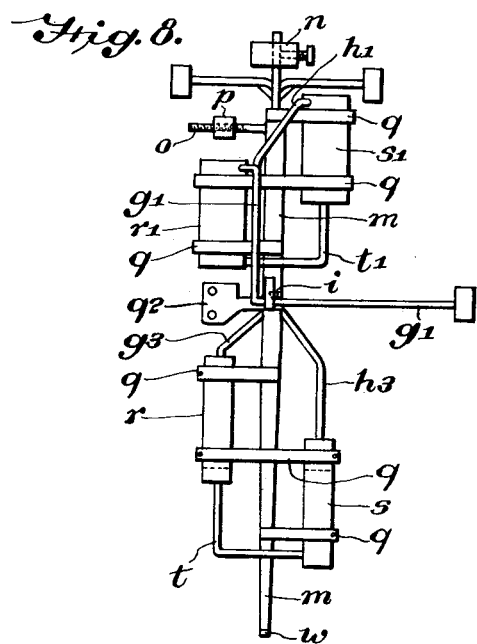
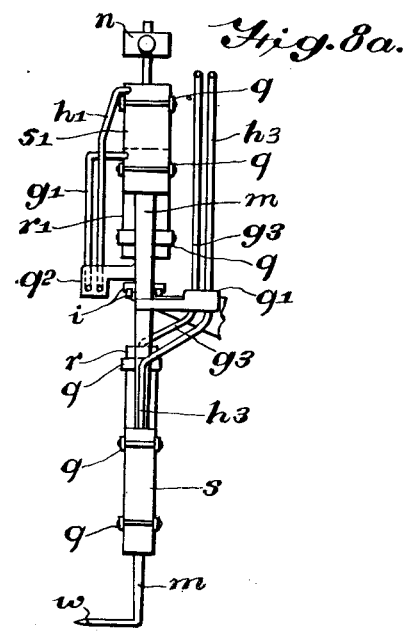

Patented June 16, 1925.

1,542,030

UNITED STATES PATENT OFFICE.

EDWARD S. BRISTOL, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

CONTROL METHOD AND APPARATUS.

Application filed April 25, 1921. Serial No. 464,485.

*To all whom it may concern:*

Be it known that I, EDWARD S. BRISTOL, a citizen of the United States, residing in the city and county of Philadelphia, State of Pennsylvania, have invented new and useful Improvements in Control Methods and Apparatus, of which the following is a specification.

In accordance with my invention, control of apparatus for measuring or controlling the flow of fluid, or for both measuring and controlling the flow of fluid, or control of any other apparatus for any suitable purpose, is effected in response to pressure changes, and more particularly in response to pressure changes due to or representative of fluid flow.

Further in accordance with my invention, the flow of a fluid may be controlled, as by maintaining the flow substantially constant, in response to pressure changes due to variations of that flow; or the flow of a secondary fluid may be controlled in response to pressure changes due to or representing changes of flow of a main or primary fluid.

Further in accordance with my invention, a differential pressure due to or representative of fluid flow may effect or control a balance structure, such as a pendular or tilting manometer, or equivalent, responsive to pressure changes, which structure in turn controls mechanism utilizable for various purposes, as for example, rebalancing the manometer, for producing a record, for varying the flow of the fluid or for varying the flow of another or secondary fluid, or for effecting any other suitable or desired control.

My invention resides in the method and apparatus hereinafter described and claimed.

For an understanding of my method, and for an illustration of some of the various forms my apparatus may take, reference is to be had to the accompanying drawings, in which:

Fig. 1 is a view, partially in elevation and partially in perspective, of apparatus embodying my invention.

Fig. 2 is a side elevational view of part of the apparatus shown in Fig. 1.

Figs. 3 and 3ª are fragmentary perspective views illustrating modifications of part of the structure of Fig. 1.

Fig. 4 is a diagrammatic view of one of the circuit arrangements utilizable with my apparatus.

Fig. 5 is a fragmentary elevational view of a modification of part of the apparatus of Fig. 1 illustrating a mode of controlling flow of a fluid.

Fig. 6 is a fragmentary elevational view of auxiliary apparatus which may be utilized in connection with apparatus such as shown in Fig. 1, or equivalent, for controlling the flow of a secondary fluid.

Fig. 7 is a diagrammatic view of a circuit arrangement relating to the employment of apparatus such as indicated in Fig. 6.

Figs. 8 and 8ª are, respectively, front and side elevations of modified structure for controlling flow of a secondary fluid by the flow of a primary fluid.

Fig. 9 is a fragmentary view, partially diagrammatic, of auxiliary apparatus utilizable for controlling the flow of a fluid.

Referring to Figs. 1 and 2, A is a pipe or conduit through which flows, as from right toward the left in Fig. 1, fluid of any desired character, as gas, vapor or liquid. Controlling the flow is a valve V, which may be operated or controlled manually, or which may be automatically controlled as hereinafter described. Between the flanges $a$ of neighboring pipe lengths is held the flange $b$ of a nozzle N, at whose downstream end is the plug $c$ fitting within the pipe A and having the packing $d$ for making a substantially tight joint. At the throat of the nozzle N is a circumferential series of perforations $e$ communicating with the space or chamber $f$, with which communicates the pressure tube or pipe $g$. Communicating with the interior of the pipe A on the upstream side of the nozzle N is a similar pressure tube or pipe $h$. These tubes lead to the fixed supports $g^2$ and $h^2$, where they connect, respectively, with tubes $g^3$ and $h^3$, which lead, respectively, to the upper ends of chambers $r$ and $s$. The chambers $r$ and $s$ have their bottoms connected by the tube $t$ and form therewith a U-tube manometer. Within chambers $r$ and $s$ is a mass of liquid, whose level for zero differential pressure is indicated at $u$, as mercury, or in general, a liquid heavier than and immiscible with the liquid or fluid flowing in the pipe A. The tubes $g^3$ and $h^3$ are bent laterally in opposite directions, as indicated, and then come adjacent to each other, one in front of the other, substantially in the same vertical plane with the knife edge $i$ resting upon bearing members $j$ carried by the fixed bracket $k$. The knife edge $i$ is carried by the pendular or oscillatory member $m$, to which is secured by brackets or clamps $q$ the manometer chambers $r$ and $s$. A bracket $q^1$, on the member $m$, is employed to attach the tubes $g^3$ and $h^3$ to the oscillatory manometer structure; the points of attachment are substantially in line with the knife edge $i$. From and below the supports or abutments $q^2$ and $h^2$ to the bracket $q^1$ the tubes $g^3$ and $h^3$ are flexible and elastic, and thus permit swinging of the manometer structure upon the knife edge $i$ in response to changes of the mercury levels in the chambers $r$ and $s$ in response to changes of rate of flow of fluid through the nozzle N. Each of the tubes $g^3$ and $h^3$ may be stiffened where it bends downwardly, as by corner plates or braces $v$, to prevent any tendency to straighten out due to the internal pressure. At the upper end of the oscillatory member $m$ is fixed the coil or electro-magnetic winding B co-acting with stationary coils or electro-magnetic windings C and D. On the member $m$ may be carried also the weight $n$, which may be adjusted to a suitable vertical height upon the member $m$ to secure the desired degree of sensitivity of the oscillatory system in response to changes of differential pressure. A balance weight $p$ may also be provided, adjustable longitudinally of the arm $o$ extending laterally from member $m$.

It will be understood that in place of the U-tube manometer structure with flexible connecting tubes described above, there may be employed any other suitable means for producing a force upon the oscillatory system which is proportional to the pressure differential. Also, in place of the nozzle N, may be employed any other suitable nozzle structure, or any other suitable structure, utilizable for producing a differential pressure representative of or dependent upon the rate of flow of the fluid.

From the lower end of the member $m$ extends laterally the needle or pointer $w$, easily flexed in vertical direction.

As another arrangement, the needle or pointer $w$ may be independently mounted upon the vertically pivoted member $x$, Fig. 3, and be deflected by the member $m$ whose lower end is provided with a pin $y$ loosely fitting in slot $y^1$ in pointer $w$.

In Fig. 3ᵃ is shown a further modification wherein the member $m$ carries at its lower end the permanent magnet $y^2$, between whose pointed poles is disposed the thin or pointed armature $y^3$, of soft iron, carried by the pointer $w$, of non-magnetic material, and supported upon the pivoted member $x$, as in Fig. 3.

As to the above described manometer structure and the other manometer structures hereinafter referred to, it will be understood that if suitable or desirable, damping means may be provided. Such damping means may comprise, as indicated in Fig. 2, a plate or vane $z$ attached or otherwise suitably related to the member $m$ by a member $z^1$ and submerged in a liquid, as oil or equivalent, of suitable viscosity, in a container $z^2$.

The pointer $w$ co-acts with the mechanism now to be described and of a nature similar to that disclosed in Letters Patent of the United States to Leeds No. 1,125,699, my invention not being limited to employment of such particular apparatus, but comprehending that apparatus or any equivalent thereof, or other suitable apparatus performing the functions of the character herein desired or required.

M is any suitable source of power, as a continuously rotating electric motor whose speed is preferably rendered practically constant or uniform. Upon the motor shaft 1 is a worm 2 meshing with the worm gear 3 which drives the shaft 4. Pivoted near its upper end on horizontal pivots, not shown is a lever 5, movable about a horizontal axis parallel to the sheet of the drawing; on lever 5 is horizontally pivoted at 6ᵃ the arm 6, on each end of which is a shoe 7 of cork or other suitable material biased, by means not shown, toward and frictionally engaging the rim 8 of the clutch disk or wheel 9 secured upon the shaft 10 of movable structure controlled by the aforesaid pointer or needle $w$. Secured upon the continuously rotating shaft 4 is a cam 11 which periodically engages and moves the member 5 outward from the disk 9 in opposition to a spring, not shown, thereby lifting the shoes 7 free from the rim 8 of disk 9, said spring returning the shoes 7 into engagement with the rim 8 after predetermined rotation of cam 11. Upon the shaft 4 is secured a second cam 12 which, after the cam 11 has lifted shoes 7 from rim 8, engages and moves toward the observer the end of finger 13 on the lower end of the arm 14, secured at its upper end to the member 15 pivoted at 16. Upon the member 15 is secured the member 17, whose upper edges 18 are inclined. Disposed immediately above the edges 18 is the needle or pointer $w$ of the tilting manometer structure. At opposite ends of the member 17 are the abutments 21 limiting the lateral deflection of the needle or pointer $w$. Above the needle $w$ are the edges 22, 22, upon members 23, 23, pivoted at 24, 24 for movement about horizontal axes normal to the sheet of the drawing and extending toward each other, leaving a gap between their inner ends. The members 23 have the downwardly extending arms 25, 25 drawn towards each other by the spring 26. Attached to the lower end of the arm or lever 5 is the triangular plate 27 carrying pins 28, 28 co-operating with the lower ends of the members 25, 25. At opposite ends of the arm 6 are the ears or lugs 29, 29 adapted to be engaged by the cams 30, 30, similar in shape and similarly positioned and secured upon the shaft 4. Secured upon the shaft 10 is a wheel or disk 31 of insulating material, carrying upon its periphery the resistance conductors R and $R^1$ upon which bear, respectively, the stationary brushes 32 and 33.

The structure above described will be recognized to be of the character disclosed in the aforesaid Letters Patent to Leeds No. 1,125,699.

There may be secured upon the shaft 10 for purposes hereinafter described in connection with Fig. 8, the further disk 40 of insulating material, upon whose periphery is disposed the resistance conductor $R^3$, upon which bears the stationary brush 41.

Referring to Fig. 4, there is shown diagrammatically a circuit arrangement utilizable with the apparatus above described. G is any suitable source of electric current. It may be a source of alternating current, as indicated, or it may be a source of direct current. One terminal is connected to one terminal of each of the aforesaid resistances R and $R^1$, with which co-act the interconnected brushes 32 and 33 connected to the serially connected coils C, B and D, in series with which may be connected an instrument E connected to the other terminal of the resistance $R^1$, from which terminal connection is made through the resistance $R^2$ to the other terminal of the source G.

The instrument E may be an indicating, recording or integrating ammeter, or a combination of any of such instruments may be employed in the relation of the instrument E. Such instrument or instruments may be calibrated or read in terms of current or fluid flow, or both.

Assuming the voltage of the source G to remain substantially constant, the resistances are so proportioned or given such magnitudes that the square of the current traversing the coils C, B and D and instrument E is substantially or approximately proportional to the distance of the brushes 32, 33 at any time from the upper ends of the resistances R, $R^1$. The current traversing the coils C, B and D produces electro-magnetism causing the fixed coils C, D to exert upon the movable coil B a resultant force proportional to the square of the current traversing these coils. In consequence, equal displacements of the brushes 32, 33 along their resistances R, $R^1$, that is, equal angular movements of the shaft 10 and disk 31, effect substantially or approximately equal changes in the resultant force exerted by the stationary coils C and D upon the movable coil B, throughout the entire range of movement of the disk 31, that is, throughout the entire range of movement of the resistances R, $R^1$ with respect to their brushes 32 and 33. The force exerted upon the movable coil B, and therefore upon the tilting manometer structure, opposes the force exerted upon the manometer structure by the differential pressure, which in turn is proportional to the square of the rate of flow of fluid through the pipe A. The resistance arrangement described is desirable in that it secures an approximately uniform action of the control mechanism in response to changes of differential pressure over the entire working range of the apparatus. By this arrangement the displacement of the movable structure, as shaft 10 and parts connected thereto, is substantially directly proportional to the pressure operating upon the oscillating system $m$ and is of advantage in that throughout the working range of the apparatus the sensitivity remains substantially constant. It will be understood, however, that any other suitable form of rheostat may be employed.

Without limitation of my invention thereby, it is pointed out that in proportioning the resistances of Figs. 4 and 7 for purposes of the character above described, there may be employed the equation as follows:

$$R = \frac{(R^1[R^2N(\sqrt{L}-1) + (R^2R^1 + R^1N)(\sqrt{L}-L)]}{(R^2N + R^1 \times N)(1-\sqrt{L}) + R^1 \times R^2(L-\sqrt{L}) + R^21(L-L^2)}$$

in which:

R, $R^1$ and $R^2$ are, respectively, the magnitudes of the resistances R, $R^1$, $R^2$ of Figs. 4 and 7.

N is the total remaining resistance of the balance coil branches of Figs. 4 and 7, that is, N includes the resistance of coils C, B, D and instrument E of Fig. 4, and the resistance of the coils C, B, D, and coils $C^1$, $B^1$, $D^1$ and instrument E of Fig. 7, and any other resistance that may be in the balance coil branch.

L is the displacement of the brushes 32 and 33 from the upper ends of resistances R and $R^1$, respectively, of Figs. 4 and 7, that is, the displacement from position for zero balance coil current, expressed as a fraction of maximum displacement of the brushes 32 and 33 from the upper ends of the resistances R and $R^1$.

The magnitude of resistance N is known; the magnitude of resistance R² is so fixed that the maximum current through the balancing coils desired is equal to the electromotive-force of the source G divided by the sum of the resistances N and R²; and resistance R¹ is given some convenient and comparatively high value. The problem is then so to fix the value of the resistance R that the square of the current through the balancing coils is equal to a constant multiplied by the displacement L, and this value of the resistance R is obtained by substituting in the foregoing equation for the other resistances their respective values, and taking for L one value thereof, as for example, one-half, and then for each other value of the displacement L the relation holds approximately true that the square of the current through R is a constant multiplied by the then value of the displacement L.

If resistance N can be given a value such that R² may be made zero, the foregoing equation becomes simplified as follows:

$$R = \frac{R^1 \times N(\sqrt{L}-L)}{N(1-\sqrt{L}) + R^1(L-L^2)}$$

The operation of the apparatus is briefly as follows:

Upon occurrence of a change in the rate of flow of fluid through the conduit A there will be a corresponding change in the difference between the pressures exerted upon the mercury in the tubes $r$ and $s$, causing flow of mercury from one to the other, causing the structure to one side of the knife edge $i$ to be heavier than the other side and so cause deflection toward the right or left of the needle or pointer $w$, the extent of deflection being dependent upon the magnitude of the differential pressure and therefore upon the magnitude of change in the rate of flow of fluid in the pipe A. When the apparatus becomes so unbalanced, the pointer $w$ will deflect, as for example, toward the right, and will be periodically pinched or clamped between the right hand edges 18 and 22, the arm 6 being meanwhile disengaged from the disk 9 and then reengaged therewith when set at an angle corresponding with the deflection of the pointer $w$, and a cam 30 will thereafter restore the $w$, and clutch member 6 to horizontal position and in so doing rotate the disk 9 and the shaft 10 through an angle corresponding with the deflection of the pointer $w$. This, however, effects a movement of the resistance R, R¹ with respect to their brushes 32, 33, causing a change in the strength of current through the coils C, B and D, and thereby changing the resultant force exerted upon the coil B by the coils C and D, tending to rebalance the structure by bringing the pointer $w$ back toward the mid, neutral or zero position indicated in Fig. 1. The shaft 10 is stepped around greater distances for greater deflections of the member $w$ and less distances for lesser deflections. The result is that by successive steps, the shaft 10 is stepped around until the force exerted upon the coil B, and therefore upon the manometer structure, balances the force exerted thereon by the differential pressure, causing rebalance of the structure as indicated in Fig. 1. The same operation is repeated for subsequent deflections of the pointer $w$, deflection in one direction causing rotation of shaft 10 in one direction, while deflection in the other direction causes movement of the shaft 10 in opposite direction.

Since the force acting upon the manometer structure to deflect the pointer $w$ is a function of the square of the rate of flow of fluid through the pipe A, and since the balancing force exerted upon the coil B is a function of the square of the current traversing the balancing coils C, B and D, the actual magnitude of the current flowing through these coils and the ammeter or other instrument E is a measure of the magnitude of rate of flow of fluid through the pipe A. Consequently, the extent of deflection of the instrument E will depend upon the rate of flow, and such instrument may therefore have its scale or record sheet directly calibrated in terms of rate of flow.

In lieu of or in addition to controlling an ammeter or other instrument E, the apparatus, as by shaft 10, may effect any other suitable control or controls, examples of which will now be described.

Referring to Fig. 5, the shaft 10 corresponds with the shaft 10 of Fig. 1, and is assumed to be similarly controlled by a tilting manometer or equivalent mechanism responsive to changes in rate of flow. In this case the shaft 10 drives the shaft 42 through any suitable means, for example, the gearing illustrated. The shaft 42 through the coupling structure 43 rotates the stem 44 of the valve V, which may be the valve V controlling the flow in the pipe A of Fig. 1. In such case the balancing coils C, B, D and the resistances R, R¹ of Fig. 1 may be omitted or not employed, in which case the shaft 10 under control of the tilting manometer will control the valve V to vary the rate of flow in the pipe A in response to variations from normal or predetermined rate of flow, and thereby cause the rate of flow in the pipe A beyond the valve V, Figs. 1 and 5, to be maintained at substantially constant magnitude or value.

If, however, the balancing coils and the resistances R, R¹ are employed, as in the relation indicated in Fig. 4 and hereinbefore described, the valve V of Fig. 5 may control the flow of a secondary fluid, in which case the pipe A of Fig. 5 is a pipe different from the pipe A of Fig. 1, and the rate of flow of the secondary fluid will be varied in response to changes in the rate of flow of fluid in the pipe A of Fig. 1. For this purpose the disk 31 carrying the resistances R, $R^1$ may be on a shaft 45 driven by the shaft 42, as through the gearing indicated, to allow the valve stem to make several or many revolutions for one revolution of disk 31.

Referring to Fig. 6, $A^1$ is a pipe or conduit conveying a secondary fluid whose rate of flow is controllable by the valve $V^1$ and which flows through a nozzle structure $N^1$ similar to the nozzle structure of Fig. 1 or the equivalent thereof. Associated with the nozzle $N^1$ is a second tilting manometer structure having the pressure pipes $g^1$ and $h^1$ communicating with the mercury tubes $r^1$ and $s^1$ tilting upon the knife edge $i^1$ and provided with balancing coil structure comprising the movable coil $B^1$ carried on the manometer member $m^1$, which again controls mechanism similar to that indicated in Fig. 1, such mechanism being fragmentarily indicated and as having the shaft 10 controlling rotation of the stem 44 of the valve $V^1$.

As indicated in Fig. 7, the balancing coil structure of the apparatus shown in Fig. 6 comprises the stationary coils $C^1$ and $D^1$ co-acting with the aforesaid movable coil $B^1$. These coils are in series with each other and with the coils C, B, D of the apparatus shown in Fig. 1, and associated also with the resistances R, $R^1$, similar or equivalent to the resistances R, $R^1$ of Fig. 1 in the circuit arrangement shown in Fig. 7. In this case again either alternating or direct current may be employed, the source G in this example being indicated as a source of direct current.

The apparatus of Fig. 6 is therefore auxiliary to that shown in Fig. 1, and the operation is as follows:

The apparatus of Fig. 1 functions as previously described, causing rotation of the shaft 10 to correspond with changes in rate of flow of primary fluid in the pipe A, the apparatus automatically balancing itself by the action of the resistances R, $R^1$ upon the current traversing the balancing coils C, B and D. But the balancing coils of Fig. 6 are traversed by the same current traversing the balancing coils of the apparatus of Fig. 1, and there is exerted therefore upon the tilting manometer structure of Fig. 6 an electromagnetic force corresponding with the rate of flow of the primary fluid in the pipe A. This unbalancing force by the coils $C^1$, $B^1$, $D^1$ operates in opposition to the differential pressure caused by the flow of the secondary fluid through the nozzle structure $N^1$. The apparatus of Fig. 6, therefore, causes operation of the stem 44 of the valve $V^1$ to vary the flow of the secondary fluid in pipe $A^1$ to correspond with or be proportional to the rate of flow of primary fluid in the pipe A, the force exerted upon the manometer structure through the coil $B^1$ determining what shall be the magnitude of the differential pressure exerted through the pipes $g^1$ and $h^1$ to cause a balance of the apparatus of Fig. 6, and such differential pressure is varied to effect a balance by rotating to suitable extent the stem 44 of the valve $V^1$. Accordingly, the apparatus of Fig. 6 functions to reflect in or reproduce by the secondary fluid in pipe $A^1$ the variations in rate of flow of the primary fluid in pipe A.

Referring to Figs. 8 and $8^a$, there is shown a form of apparatus with which the differential pressures due, respectively, to a primary and a secondary fluid, may be directly balanced one against the other.

The lower U-tube structure, comprising the tubes or vessels $r$ and $s$, corresponding with the U-tube structure of Fig. 1, is subjected to the differential pressure resulting from the primary flow. This U-tube structure is disposed below the knife edge $i$ and is supported by the member $m$ carrying at its lower end the pointer or needle $w$, or, as indicated in Figs. 3 and $3^a$, controlling a needle or pointer $w$ co-acting with automatic mechanism such as described in connection with Fig. 1. In this case the flexible tubes $g^3$ and $h^3$ are led down to the abutment or clamping block $q^1$ attached to the member $m$. The upper U-tube structure may correspond with that indicated in Fig. 6 and subjected to the differential pressure set up by the secondary flow. The tubes or vessels $r^1$ and $s^1$ are interconnected by the tube $t^1$, and are secured by clamps $q$ to the pivoted member $m$. The flexible tubes $g^1$ and $h^1$ extend downwardly to the abutment or clamp $q^2$ attached to the member $m$, and from such abutment extend upwardly and communicate with the tubes $r^1$ and $s^1$ at their upper ends.

Both manometer structures are carried by the same pendular or oscillating member $m$, whose pointer or needle $w$ controls but a single automatic mechanism such as shown in Fig. 1, in lieu of two such mechanisms as described in connection with the apparatus of Fig. 6 when utilized in connection with the apparatus of Fig. 1 when controlling a secondary by a primary flow. The control coils B, C, D and $B^1$, $C^1$ and $D^1$ are in this case omitted. The automatic mechanism controlled by the pointer $w$ may be such as indicated in Fig. 6 for controlling a valve $V^1$ for controlling the flow of the secondary fluid. The two manometer structures oppose each other in their action upon or control of the member $m$. Accordingly, the control mechanism will cease to adjust the secondary flow when the pressure differential due to the secondary flow has been made such as to act upon the upper manometer so to oppose the lower manometer to bring the pointer or needle $w$ to the mid, neutral or zero position, and accordingly the relation between the two pressure differentials, and therefore the ratio between the primary and secondary rates of flow, will thus be maintained substantially constant.

Referring to Fig. 9, the rate of flow of a secondary fluid through the conduit or pipe $A^2$ is controlled by the damper or valve member $V^2$. The primary control is by apparatus of the character indicated in Fig. 1, in this instance, however, provided with the above mentioned resistance $R^3$ rotated by shaft 10 with respect to the stationary brush 41. The resistance $R^3$ constitutes two arms of a Wheatstone bridge whose remaining two arms are constituted by the resistance $R^4$ carried by the disk 46, Fig. 9, by which it is rotated with respect to the stationary brush 47. Between the brushes 41 and 47 is connected a galvanometer H, the coil of this galvanometer being indicated at 48, Fig. 1, and as having the pointer or needle 49 disposed between the contact disks 50 and 51 insulated from each other and rotated by the shaft 4.

The galvanometer H and brushes 41 and 47 are in one conjugate conductor of the Wheatstone bridge, while the battery or source of current 52 is in the other conjugate conductor. The galvanometer needle 49 connects through the source of current or battery 53 with one terminal of the armature of the electric motor $M^1$, whose other terminal connects with the common terminal of reversely acting series fields, as well understood in the art, whose remaining terminals are connected to the contact disks 50 and 51 through the conductors 54 and 55.

The operation is as follows:

As described in connection with Fig. 1, the shaft 10 is rotated in one direction or the opposite an extent depending upon the change in the increasing or decreasing rate of flow of the fluid in the pipe A. In consequence, the resistance $R^3$ is similarly moved with respect to its brush 41 and, assuming a change from balanced or normal position, the Wheatstone bridge will be unbalanced because of such movement, and the galvanometer H will deflect its needle 49 in one direction or the other, causing energization of the motor $M^1$, which will rotate in a corresponding direction and so actuate the valve or damper $V^2$ by driving the shaft 56 in proper direction and thereby actuating the pulley 57 around which passes a cord 58 which passes around the pulley 59, on whose shaft is secured the damper or valve $V^2$, counter-weights 60 and 61 being attached to the opposite ends of the cord 58. Accordingly, the damper or valve $V^2$ is rotated to suitable extent and thereby varies the rate of flow of fluid through the pipe $A^2$. Simultaneously the disk 46 is rotated by the motor $M^1$, causing the resistance $R^4$ to move with respect to the stationary brush 47, and in such direction as to tend to rebalance the Wheatstone bridge, which is eventually rebalanced after suitable extent of movement of the valve $V^2$ and disk 46. Deflection of galvanometer needle 49 in opposite direction will cause movement of valve $V^2$ in opposite direction.

In consequence, the apparatus of Fig. 9, in association with the apparatus of Fig. 1, causes variation in rate of flow of secondary fluid in pipe $A^2$ to correspond with or be directly proportional to the rate of flow of primary fluid through the pipe $A^1$. It will be understood that any other suitable arrangement of relay mechanism may be employed in place of the type shown in Fig. 9. Also, relay mechanism may be employed, in a manner similar to that shown in Fig. 9, in connection with the apparatus shown in Figs. 6 and 8 to operate a valve or perform any other function that requires more power than the control mechanism can conveniently be made to transmit directly.

In connection with Figs. 5, 6, 8 and 9, it will be understood that the primary fluid may be of any suitable character or nature, and the secondary fluid may be of similar or any other character or nature. For example, as to Figs. 5 and 6, the primary fluid may be water, as boiler feed water, while the secondary fluid in pipe A of Fig. 5 or pipe $A^1$ of Fig. 6 may be water containing suitable chemical reagent which is eventually mixed with the water delivered from the pipe A of Fig. 1 for softening or other treating purposes. Or the primary fluid in the pipe A of Fig. 1 may be a chemical or other solution to which is to be added merely diluting liquid or liquid containing similar or different chemicals, which may be delivered into the primary liquid or to some other destination. Or the fluid in pipe A of Fig. 1 may be a gas or vapor, while the secondary fluid of Figs. 5 and 6 may be similar or different gases or vapors or a liquid.

And as to Fig. 9, the secondary fluid in the pipe A may be air, gas or vapor. For example, it may be air delivered to the fire box of a furnace of a boiler, which delivers steam as the primary fluid in the pipe A of Fig. 1. Or the secondary fluid may be related to the primary fluid, as described in connection with Figs. 5 and 6.

What I claim is:

1. In a control system, structure actuated in response to changes in magnitude of a condition, a deflecting member mechanically connected with and actuated by said structure, a movable structure, a source of power, a disengageable mechanical connection between said source of power and said movable structure controlled by said deflecting member, and control mechanism controlled by said movable structure.

2. In a control system, structure actuated in response to changes in magnitude of a condition, a deflecting member, co-acting magnetic members on said deflecting member and said structure to effect deflection of said deflecting member, a movable structure, a source of power, a disengageable mechanical connection between said source of power and said movable structure and controlled by said deflecting member, and control mechanism controlled by said movable structure.

3. The combination with structure actuated in response to changes in magnitude of a condition, of a deflecting member mechanically connected with and actuated by said structure, a movable structure, a source of power, a disengageable mechanical connection between said source of power and said movable structure controlled by said deflecting member, electro-magnetic means exerting on said deflecting member a force in opposition to that causing its deflection, and means actuated by said movable structure controlling the magnitude of the force exerted on said deflecting member by said electro-magnetic means.

4. The method of effecting a control by flow of fluid, which consists in producing a differential pressure by the flow, actuating a deflecting member by said pressure, effecting displacement of a movable structure by said deflecting member proportionate to said differential pressure, opposing to said pressure an electro-magnetically produced force, varying the current producing said force in such manner that equal changes in the magnitude of said force correspond with equal changes of magnitude of said displacement, and effecting a control by said displacement of said movable structure.

5. The method of effecting a control by flow of fluid, which consists in producing a differential pressure by the flow, actuating a deflecting member by said pressure, effecting displacement of a movable structure by said deflecting member proportionate to said differential pressure, opposing to said pressure an electro-magnetically produced force, varying the current producing said force in such manner that equal changes in the magnitude of said force correspond with equal changes of magnitude of said displacement, and controlling in accord with said displacement of said movable structure the production of a record.

6. The combination with a source of fluid pressure, of structure actuated by pressure from said source, a deflecting member mechanically connected with and actuated by said structure, a movable structure, a source of power, a disengageable mechanical connection between said source of power and said movable structure controlled by said deflecting member, and control mechanism controlled by said movable structure.

7. The method of effecting a control by flow of fluid, which consists in producing a differential pressure by the flow, actuating a deflecting member by said pressure, effecting displacement of a movable structure by said deflecting member proportionate to said differential pressure, opposing to said pressure an electro-magnetically produced force, varying the current producing said force in such manner that equal changes in the magnitude of said force correspond with equal changes of magnitude of said displacement, and controlling the flow of a second fluid in response to said displacement of said movable structure.

8. The combination with a source of fluid pressure, of structure actuated by pressure from said source, a deflecting member mechanically connected with said structure and deflected to different extents in response to different pressures, a movable structure, a source of power, a disengageable mechanical connection between said source of power and said movable structure controlled by said deflecting member whereby said movable structure is displaced to different extents corresponding with said different pressures, and control mechanism controlled by said movable structure.

9. The combination with a source of fluid pressure, of structure actuated by pressure from said source, a deflecting member mechanically connected with said structure and deflected to different extents in response to different pressures, a movable structure, a source of power, a disengageable mechanical connection between said source of power and said movable structure controlled by said deflecting member whereby said movable structure is displaced to different extents corresponding with said different pressures, and a recorder controlled by said movable structure.

10. The method of controlling the flow of a secondary fluid by the flow of a primary fluid, which consists in producing a differential pressure by the flow of said primary fluid, actuating a deflecting member by said pressure, effecting displacement of a movable structure by deflection of said deflecting member, effecting by said displacement application to said deflecting member of a force opposing said pressure and controlling the flow of the secondary fluid in response to said displacement.

11. The method of controlling the flow of a secondary fluid by the flow of a primary fluid, which consists in actuating a deflecting member by a pressure dependent upon the flow of the secondary fluid, producing a displacement of a movable structure by the deflection of said deflecting member, exerting on said deflecting member a counterbalancing force corresponding with the flow of the primary fluid, and effecting variation of flow of the secondary fluid in response to said displacement of said movable structure.

12. The method of controlling the flow of a secondary fluid by the flow of a primary fluid, which consists in actuating a deflecting member by a pressure dependent upon the flow of the primary fluid, effecting displacement of movable structure by said deflecting member, controlling by said displacement the application to said deflecting member of a counter-balancing force corresponding with said displacement, actuating a second deflecting member by a pressure dependent upon the flow of the secondary fluid, opposing said last named pressure by a force corresponding with the counterbalancing force acting on said first named deflecting member, causing displacement of a second movable structure by said second deflecting member, and varying the flow of the secondary fluid in accordance with said displacement of said second movable structure.

13. The combination with a source of fluid pressure, of structure actuated by pressure from said source, a deflecting member mechanically connected with and actuated by said structure, a movable structure, a source of power, a disengageable mechanical connection between said source of power and said movable structure controlled by said deflecting member, and a recorder controlled by said movable structure.

14. The combination with a source of fluid pressure, of structure actuated by pressure from said source, a deflecting member mechanically connected with said structure and deflected to different extents in response to different pressures, a movable structure, a source of power, a disengageable mechanical connection between said source of power and said movable structure controlled by said deflecting member whereby said movable structure is displaced to different extents corresponding with said different pressures, and a valve controlled by said movable structure.

15. Control apparatus comprising a deflecting member, means for actuating said member to deflect it, electro-magnetic means and a source of current therefor for exerting on said deflecting member an opposing force, a movable structure, means whereby said movable structure is displaced in response to deflection of said deflecting member, means controlled by said movable structure for varying the current energizing said electro-magnetic means, and a valve controlled by said movable structure.

16. Control apparatus comprising a deflecting member, means for actuating said member to deflect it, electro-magnetic means and a source of current therefor for exerting on said deflecting member an opposing force, a movable structure, means whereby said movable structure is displaced in response to deflection of said deflecting member, means controlled by said movable structure for varying the current energizing said electro-magnetic means, and a recorder and a valve controlled by said movable structure.

17. Control apparatus comprising a deflecting member, means for actuating said deflecting member comprising a differential pressure device responsive to changes in flow of a fluid, electro-magnetic means for exerting on said deflecting member an opposing force, a movable structure, means whereby said movable structure is displaced an extent dependent upon the deflection of said deflecting member, means controlled by said movable structure for varying the current of said electro-magnetic means whereby equal changes in the magnitude of the force exerted by said electro-magnetic means correspond with equal displacements of said movable structure, and a device controlled by said movable structure.

18. Control apparatus comprising a deflecting member, means for actuating said deflecting member comprising a differential pressure device responsive to changes in flow of a fluid, electro-magnetic means for exerting on said deflecting member an opposing force, a movable structure, means whereby said movable structure is displaced an extent dependent upon the deflection of said deflecting member, means controlled by movable structure for varying the current of said electro-magnetic means whereby equal changes in the magnitude of the force exerted by said electro-magnetic means correspond with equal displacements of said movable structure, and a recorder controlled by said movable structure.

19. Control apparatus comprising a deflecting member, means for actuating said deflecting member comprising a differential pressure device responsive to changes in flow of the fluid, electro-magnetic means for exerting on said deflecting member an opposing force, a movable structure, means whereby said movable structure is displaced an extent dependent upon the deflection of said deflecting member, means controlled by said movable structure for varying the current of said electro-magnetic means whereby equal changes in the magnitude of the force exerted by said electro-magnetic means correspond with equal displacements of said movable structure, and a valve controlled by said movable structure.

20. Control apparatus comprising a deflecting member, means for actuating said deflecting member comprising a differential pressure device responsive to changes in flow of a fluid, electro-magnetic means for exerting on said deflecting member an opposing force, a movable structure, means whereby said movable structure is displaced an extent dependent upon the deflection of said deflecting member, means controlled by said movable structure for varying the current of said electro-magnetic means whereby equal changes in the magnitude of the force exerted by said electro-magnetic means correspond with equal displacements of said movable structure, and a valve and a recorder controlled by said movable structure.

21. Control apparatus comprising a deflecting member, a device actuated by pressure due to fluid flow, a mechanical connection between said deflecting member and said device causing deflection of said deflecting member to extents corresponding with different rates of fluid flow, a movable structure, a source of power, and a disengageable mechanical connection between said source of power and said movable structure controlled by said deflecting member to effect displacements of said movable structure corresponding with different rates of fluid flow.

22. Control apparatus comprising a deflecting member, a movable structure, a source of power, a disengageable mechanical connection between said source of power and said movable structure controlled by said deflecting member, a differential pressure device responsive to changes in fluid flow for actuating said deflecting member, and a valve controlled by said movable structure.

23. Control apparatus comprising a deflecting member, a device actuated by pressure due to fluid flow, a mechanical connection between said deflecting member and said device causing deflection of said deflecting member to extents corresponding with different rates of fluid flow, a movable structure, a source of power, a disengageable mechanical connection between said source of power and said movable structure controlled by said deflecting member to effect displacements of said movable structure corresponding with different rates of fluid flow, and a recorder controlled by said movable structure.

24. Control apparatus comprising a deflecting member, a device actuated by pressure due to fluid flow, a mechanical connection between said deflecting member and said device causing deflection of said deflecting member to extents corresponding with different rates of fluid flow, a movable structure, a source of power, a disengageable mechanical connection between said source of power and said movable structure controlled by said deflecting member to effect displacements of said movable structure corresponding with different rates of fluid flow, and a control device controlled by said movable structure.

25. Control apparatus comprising a deflecting member, a movable structure, a source of power, a disengageable mechanical connection between said source of power and said movable structure controlled by said deflecting member, a differential pressure device responsive to changes in fluid flow for actuating said deflecting member, and a valve controlled by said movable structure and controlling the flow of another fluid.

26. The combination with a tilting manometer, of a deflecting member actuated thereby, a source of power, a movable structure, and a disengageable mechanical connection between said source of power and said movable structure controlled by said deflecting member to effect displacements of said movable structure corresponding with different extents of displacement of said manometer.

27. The combination with a tilting manometer, of a deflecting member actuated thereby, a source of power, a movable structure, a disengageable mechanical connection between said source of power and said movable structure controlled by said deflecting member to effect displacements of said movable structure corresponding with different extents of displacement of said manometer, and means for exerting on said manometer an opposing force.

28. The combination with a tilting manometer, of a deflecting member actuated thereby, a source of power, a movable structure, a disengageable mechanical connection between said source of power and said movable structure controlled by said deflecting member to effect displacements of said movable structure corresponding with different extents of displacement of said manometer, means for exerting on said manometer an opposing force, and means controlled by said movable structure controlling the magnitude of said force.

29. The combination with a tilting manometer, of a deflecting member actuated thereby, a source of power, a movable structure, a disengageable mechanical connection between said source of power and said movable structure controlled by said deflecting member to effect displacements of said movable structure corresponding with different extents of displacement of said manometer, and a control device controlled by said movable structure.

30. Control apparatus comprising a tilting manometer, a deflecting member movable therewith, a movable structure, means whereby said movable structure is displaced under control of said deflecting member, means for exerting on said manometer an opposing force, means controlled by said movable structure controlling the magnitude of said force, and a valve controlled by said movable structure.

31. The combination with a tilting manometer, of a deflecting member actuated thereby, a source of power, a movable structure, a disengageable mechanical connection between said source of power and said movable structure controlled by said deflecting member to effect displacements of said movable structure corresponding with different extents of displacement of said manometer, and a recorder controlled by said movable structure.

32. Control apparatus comprising a tilting manometer, a deflecting member movable therewith, a movable structure, means whereby said movable structure is displaced under control of said deflecting member, electro-magnetic means and a source of current therefor for exerting on said manometer an opposing force, and means controlled by said movable structure controlling the current traversing said electro-magnetic means to cause equal changes in the magnitude of the force exerted thereby corresponding with equal displacements of said movable structure.

33. Apparatus for controlling the flow of a secondary fluid by the flow of a primary fluid, comprising a deflecting member, a movable device for actuating the same responsive to the differential pressure caused by the primary fluid, a movable structure, means whereby said movable structure is displaced under the control of said deflecting member, means exerting an opposing force upon said differential pressure device said movable structure controlling the magnitude of said force, a second differential pressure device subjected to a differential pressure caused by the flow of the secondary fluid, a second deflecting member actuated by said last named device, means exerting an opposing force on said second differential pressure device, said movable structure controlling the magnitude of said force, a second movable structure displaced under the control of said second deflecting member, and means controlling the flow of the secondary fluid controlled by said second movable structure.

34. Apparatus for controlling the flow of a secondary fluid by the flow of a primary fluid, comprising a member deflecting in response to the rate of flow of the primary fluid, a movable structure, means whereby said movable structure is displaced under control of said deflecting member, a circuit, means for varying the current in said circuit in response to displacement of said movable structure, a second member deflecting in response to the rate of flow of a second fluid, a second movable structure controlling the rate of flow of said second fluid, means whereby said second movable structure is displaced under the control of said second deflecting member, and electro-magnetic means controlled by said circuit opposing deflection of said second deflecting member.

35. The combination with a source of fluid pressure, of structure actuated by pressure from said source, a deflecting member mechanically connected with said structure and widely deflected to different extents in response to different pressures, a movable structure, means whereby said movable structure is displaced under control of said deflecting member to extents corresponding to said different pressures, means responsive to displacement of said movable structure for opposing deflection of said deflecting member, and control mechanism controlled by said movable structure.

36. The combination with a source of fluid pressure, of structure actuated by pressure from said source, a deflecting member mechanically connected with said structure and widely deflected to different extents in response to different pressures, a movable structure, means whereby said movable structure is displaced under control of said deflecting member to extents substantially, directly proportional to said different pressures, and a recorder controlled by said movable structure.

37. The combination with a deflecting member, of means responsive to changes in rate of flow of a fluid actuating said deflecting member to corresponding extents, a movable structure, means whereby said movable structure is displaced under control of said deflecting member to extents corresponding with changes in rate of flow of said fluid, means responsive to displacement of said movable structure for exerting on said deflecting member a force opposing its deflection, and means controlling the flow of a second fluid controlled to corresponding extents by said movable structure.

38. The combination with a source of fluid pressure, of structure actuated by pressure from said source, a deflecting member mechanically connected with and actuated by said structure, a movable structure, a source of power, a disengageable mechanical connection between said source of power and said movable structure controlled by said deflecting member, means for exerting on said deflecting member a rebalancing force, and means controlled by movements of said movable structure controlling the magnitude of said force.

39. The combination with a source of fluid pressure, of structure actuated by pressure from said source, a deflecting member mechanically connected with and actuated by said structure, a movable structure, a source of power, a disengageable mechanical connection between said source of power and said movable structure controlled by said deflecting member, means for exerting on said deflecting member a rebalancing force, means controlled by movements of said movable structure controlling the magnitude of said force, and means controlling the flow of a fluid controlled by said movable structure.

40. The combination with a source of fluid pressure, of structure actuated by pressure from said source, a deflecting member mechanically connected with and actuated by said structure, a movable structure, means whereby said movable structure is displaced under control of said deflecting member, means exerting on said deflecting member a rebalancing force, means controlled by said movable structure controlling the magnitude of said force, and means controlling the flow of a fluid controlled by said movable structure.

41. The combination with a member deflected in response to changes in magnitude of a quantity, of means controlled by said deflecting member for producing a force corresponding to said changes in magnitude of said quantity, a second deflecting member subjected to said force, means for subjecting said second deflecting member to a second force representative of changes in the magnitude of a second quantity, and control mechanism controlled by said second deflecting member.

42. The combination with a member deflected in response to changes in magnitude of a quantity, of means controlled by said deflecting member for producing a force corresponding to said changes in magnitude of said quantity, a second deflecting member subjected to said force, means for subjecting said second deflecting member to a second force representative of changes in the magnitude of a second quantity, and means for effecting changes in the magnitude of said second quantity controlled by said second deflecting member.

43. The combination with a member deflected in response to changes in magnitude of a quantity, of means controlled by said deflecting member for producing a force corresponding to said changes in magnitude of said quantity, a second deflecting member subjected to said force, means for subjecting said second deflecting member to a second force representative of changes in the magnitude of a second quantity, and control mechanism controlled by said second deflecting member, said forces opposing each other in their effect upon said deflecting member.

44. The combination with a member deflected in response to changes in magnitude of a quantity, of means controlled by said deflecting member for producing a force corresponding to said changes in magnitude of said quantity, a second deflecting member subjected to said force, means for subjecting said second deflecting member to a second force representative of changes in the magnitude of a second quantity, and means for effecting changes in the magnitude of said second quantity controlled by said second deflecting member, said forces opposing each other in their effect upon said second deflecting member.

45. The combination with a member deflected in response to changes in the rate of flow of a fluid, of means controlled by said deflecting member for producing a force corresponding to said changes in the rate of flow of said fluid, a second deflecting member subjected to said force, means for subjecting said second deflecting member to an opposing force representative of the rate of flow of a second fluid, and means controlling the rate of flow of said second fluid controlled by said second deflecting member.

46. The combination with means for electrically producing a force varying with variations in rate of flow of a fluid, of a deflecting member subjected to said force, means exerting on said deflecting member an opposing force representative of the rate of flow of a second fluid, and means controlled by said deflecting member controlling the rate of flow of said second fluid.

47. The combination with means for producing a force varying with variations in rate of flow of a fluid, of a tilting manometer movable in response to changes in the rate of flow of a second fluid and subjected to said force, and means controlled by said manometer controlling the rate of flow of said second fluid.

48. The combination with a member deflecting in response to variations in rate of flow of a fluid, of electro-magnetic means opposing deflection of said deflecting member and controlled by said deflecting member to effect a balance, a second member deflecting in response to variations in rate of flow of a second fluid, and electro-magnetic means controlled by said first named deflecting member opposing deflection of said second deflecting member.

49. The combination with a member deflecting in response to variations in rate of flow of a fluid, of electro-magnetic means opposing deflection of said deflecting member and controlled by said deflecting member to effect a balance, a second member deflecting in response to variations in rate of flow of a second fluid, electro-magnetic means controlled by said first named deflecting member opposing deflection of said second deflecting member, and means controlled by said second deflecting member controlling the rate of flow of said second fluid.

50. The combination with a member deflecting in response to variations in rate of flow of a fluid, of electro-magnetic means opposing deflection of said deflecting member and controlled by said deflecting member to effect a balance, a second member deflecting in response to variations in rate of flow of a second fluid, electro-magnetic means opposing deflection of said second deflecting member, and means electrically relating said second electro-magnetic means with said first named electro-magnetic means to cause the forces produced thereby to vary in unison.

51. The combination with a deflecting member, of means biasing it toward normal position, means for actuating said deflecting member by and in accordance with changes in magnitude of a quantity, electro-magnetic means exerting a force on said deflecting member, a movable structure, a source of power, and a disengageable mechanical connection between said source of power and said movable structure mechanically controlled by said deflecting member to effect corresponding movements of said movable structure.

52. The combination with a deflecting member, of means biasing it toward normal position, means for actuating said deflecting member by and in accordance with changes in magnitude of a quantity, electro-magnetic means exerting a force on said deflecting member, a movable structure, a source of power, a disengageable mechanical connection between said source of power and said movable structure mechanically controlled by said deflecting member to effect corresponding movements of said movable structure, and control mechanism controlled by said movable structure.

53. The combination with a member deflected in response to changes in magnitude of a quantity, of independent means exerting on said deflecting member a force independent of said changes in magnitude of said quantity, a movable structure, and means whereby said movable structure is displaced under control of said deflecting member to extents substantially directly proportional to extents of deflection of said deflecting member.

54. The combination with a member deflected in response to changes in magnitude of a quantity, of independent electro-magnetic means exerting on said deflecting member a force independent of said changes in magnitude of said quantity, a movable structure, and means whereby said movable structure is displaced under control of said deflecting member to extents corresponding to extents of deflection of said deflecting member.

55. The combination with a member deflected in response to changes in magnitude of a quantity, of independent means exerting on said deflecting member a force independent of said changes in magnitude of said quantity, a movable structure, means whereby said movable structure is displaced under control of said deflecting member to extents substantially directly proportional to extents of deflection of said deflecting member, and control mechanism controlled by and partaking of movements of extents substantially directly proportional to the extent of movements of said deflecting member.

56. The combination with a deflecting structure of a deflecting member disconnected therefrom, and means for causing said deflecting member to move in correspondence with movements of said deflecting structure comprising a magnet on one of them and an armature on the other of them, said magnet and armature having co-acting faces narrow in the direction of deflection of said deflecting member and elongated in the direction of longitudinal extent of said deflecting member.

57. The combination with a deflecting structure, of a deflecting member disconnected therefrom, said deflecting structure and deflecting member movable about axes at right angles to each other, and means for causing said deflecting member to move in correspondence with movements of said deflecting structure comprising a magnet on one of them and an armature on the other of them, said magnet and armature having co-acting faces narrow in the direction of deflection of said deflecting member.

58. The combination with a deflecting structure, of a deflecting member disconnected therefrom, a permanent magnet carried by said deflecting structure and having poles presented to opposite sides of said deflecting member and exerting thereon an attraction causing said deflecting member to move in correspondence with movements of said deflecting structure.

In testimony whereof I have hereunto affixed my signature this 22 day of April, 1921.

EDWARD S. BRISTOL.